(12) United States Patent
Steiner et al.

(10) Patent No.: US 11,662,011 B2
(45) Date of Patent: May 30, 2023

(54) PUMP ASSEMBLY AND METHOD FOR PRODUCING A PUMP ASSEMBLY

(71) Applicant: GKN Sinter Metals AG, Brunneck (IT)

(72) Inventors: Arno Steiner, Brunico (IT); Heinrich Hecher, Antholz Mittertal (IT); Matthias Innerbichler, Ahrntal (IT); Alessandro De Nicolò, Bolzano (IT); Omar Franceschi, Masi Torello (IT); Tomasz Malogowski, Reischach (IT)

(73) Assignee: GKN Sinter Metals AG, Bruneck (IT)

( * ) Notice: Subject to any disclaimer, the term of this patent is extended or adjusted under 35 U.S.C. 154(b) by 515 days.

(21) Appl. No.: 16/622,754

(22) PCT Filed: Jun. 15, 2018

(86) PCT No.: PCT/EP2018/065927
§ 371 (c)(1),
(2) Date: Dec. 13, 2019

(87) PCT Pub. No.: WO2018/229243
PCT Pub. Date: Dec. 20, 2018

(65) Prior Publication Data
US 2020/0109774 A1   Apr. 9, 2020

(30) Foreign Application Priority Data

Jun. 16, 2017 (IT) .................. 102017000067423

(51) Int. Cl.
*F16H 57/023* (2012.01)
*F04C 2/08* (2006.01)
(Continued)

(52) U.S. Cl.
CPC ........... *F16H 57/023* (2013.01); *F04C 2/084* (2013.01); *F16H 57/0436* (2013.01);
(Continued)

(58) Field of Classification Search
CPC ............... F16H 57/023; F16H 57/0436; F16H 2057/0056; F16H 2057/02017;
(Continued)

(56) References Cited

U.S. PATENT DOCUMENTS 5,224,838 A * 7/1993 Baumgarten ......... B29C 48/387
425/102
2003/0180160 A1 9/2003 Bodzak et al.
(Continued)

FOREIGN PATENT DOCUMENTS

CN 103732921 A 4/2014
CN 206206150 U 5/2017
(Continued)

OTHER PUBLICATIONS

English Translation of CN206206150U (Year: 2017).*
(Continued)

*Primary Examiner* — Dominick L Plakkoottam
*Assistant Examiner* — Paul W Thiede
(74) *Attorney, Agent, or Firm* — Quarles & Brady LLP

(57) ABSTRACT

A pump assembly comprising at least one housing and two gear wheels. The housing comprises at least one base plate and a cover element, which are interconnectable to form a pressure chamber. An outer circumferential surface of each of the two gear wheels has a toothing, and the gear wheels intermesh via the toothings to convey a fluid. The gear wheels are arranged along an axial direction in the pressure chamber between the base plate and the cover element. The pressure chamber is formed in the housing at least by two bores. The first gear wheel is arranged in a first bore and the second gear wheel is arranged in a second bore. Centering pins are provided for aligning the bores and the gear wheels (Continued)

with respect to one another, wherein all centering pins are arranged exclusively in the cover element or exclusively in the base plate.

12 Claims, 2 Drawing Sheets

(51) Int. Cl.
*F16H 57/04* (2010.01)
*F16H 57/00* (2012.01)
*F04C 2/10* (2006.01)
*F04C 15/00* (2006.01)
*F01C 21/02* (2006.01)
*F16H 57/02* (2012.01)

(52) U.S. Cl.
CPC .............. *F01C 21/02* (2013.01); *F04C 2/102* (2013.01); *F04C 15/0073* (2013.01); *F04C 2230/22* (2013.01); *F04C 2230/603* (2013.01); *F04C 2240/56* (2013.01); *F04C 2240/60* (2013.01); *F16H 2057/0056* (2013.01); *F16H 2057/02017* (2013.01)

(58) Field of Classification Search
CPC ...... F04C 2/084; F04C 2/102; F04C 15/0073; F04C 2230/22; F04C 2230/603; F04C 2240/56; F04C 2240/60; F01C 21/02
See application file for complete search history.

(56) References Cited

U.S. PATENT DOCUMENTS

| | | | |
|---|---|---|---|
| 2008/0240945 A1 | 10/2008 | Jordan | |
| 2009/0304541 A1 | 12/2009 | Goetschenberg et al. | |
| 2013/0313385 A1* | 11/2013 | Mora | D06F 39/125 |
| | | | 248/188.4 |
| 2015/0247478 A1* | 9/2015 | Serizawa | F02M 51/061 |
| | | | 239/584 |
| 2016/0348675 A1* | 12/2016 | Ishii | F04C 11/001 |
| 2017/0045046 A1* | 2/2017 | Afshari | F04C 2/084 |
| 2021/0140427 A1* | 5/2021 | Steiner | F04C 2/086 |

FOREIGN PATENT DOCUMENTS

| | | |
|---|---|---|
| DE | 328963 C | 11/1920 |
| DE | 8315309 U1 | 10/1984 |
| DE | 10014548 A1 | 9/2001 |
| DE | 10048242 A1 | 4/2002 |
| EP | 0509218 A2 | 10/1992 |
| EP | 1156221 A2 | 11/2001 |
| EP | 2469091 A2 | 6/2012 |
| JP | S27174 B | 1/1952 |
| JP | H03294677 A | 12/1991 |
| JP | 2002021742 A | 1/2002 |
| JP | 2004176704 A | 6/2004 |
| WO | 0116465 A1 | 3/2001 |
| WO | 02077460 A1 | 10/2002 |

OTHER PUBLICATIONS

National Intellectual Property Administration, P.R. China, First Office Action and Search Report, Application No. 201880053002.3, dated Apr. 1, 2021, 21 pages.

PCT International Search Report and Written Opinion, PCT/EP2018/065927, dated Jul. 13, 2018, 22 pages.

German Patent and Trademark Office, Office Action, Application No. 102018108189.8, 7 pages.

Japan Patent Office, Notice of Reasons for Refusal, Application No. 2020-519847, dated Dec. 13, 2021, 13 pages.

* cited by examiner

PUMP ASSEMBLY AND METHOD FOR PRODUCING A PUMP ASSEMBLY

CROSS-REFERENCE TO RELATED APPLICATION

This application represents the U.S. national stage entry of International Application No. PCT/EP2018/065927 filed Jun. 15, 2018, which claims priority to Italian Patent Application No. 102017000067423 filed Jun. 16, 2017, the disclosure of which is incorporated herein by reference in its entirety and for all purposes.

BACKGROUND

The invention relates to a pump assembly and to a method for producing a pump assembly. The pump assembly is provided for conveying a fluid. The pump assembly comprises a housing and conveying means in the housing for conveying a fluid from a fluid input to a fluid output. The fluid input and the fluid output are arranged on the housing. At least one of the conveying means is driven via a drive shaft which extends into the housing from outside the housing. Two intermeshing gear wheels are provided here as the conveying means. The circumferential surface of each gear wheel has a toothing, wherein the gear wheels are coupled to each other via the toothing.

The gear wheels each have an axis of rotation, the axes of rotation being oriented in particular along an axial direction. The gear wheels are arranged next to each other in a radial direction and overlapping in the axial direction, wherein the axes of rotation are arranged parallel to each other.

In a pump assembly of this type, the conveying means can be arranged on shafts and the shafts can be mounted on bearing points in the housing on both sides of the conveying means. Furthermore, a drive shaft can be connected directly to the conveying means and the conveying means can be mounted on bearing points via the drive shaft. Mounted means here that forces acting in a radial direction (optionally additionally in an axial direction) are transmitted at least in a radial direction (optionally also in the axial direction) to the shaft or to the mounting of the shaft in the housing via the conveying means. A mounting of the shaft on both sides of the conveying means requires precise coordination of the positional tolerances of the bearing points on the housing. In particular, nonuniform loadings of the bearing points and bending loadings of the shafts can thus occur.

SUMMARY

Taking this as the starting point, it is the object of the present invention to at least partially solve the problems described with respect to the prior art. In particular, the intention is to propose a pump assembly which is designed as simply as possible, with the intention being for a nonuniform loading of the bearing points to be reduced or even avoided. The intention here is for an alignment of the components determining the efficiency of the pump assembly to be made possible with as high a degree of accuracy as possible. Furthermore, the intention is to propose a method for assembling a pump assembly, wherein the assembly is intended to take place with the least possible complexity and positional tolerances which are as small as possible.

To achieve this object, a pump assembly and a method are proposed. The features cited individually in the patent claims can be combined with one another in a technologically expedient manner and can be supplemented by explanatory facts from the description and details from the figures, with further variant embodiments of the invention being highlighted.

This is addressed by a pump assembly, wherein the pump assembly comprises at least the following components:
 a housing with at least one base plate and a cover element, which are interconnectable in order to form a pressure chamber; and
 two gear wheels (as conveying means), wherein an outer circumferential surface of the first gear wheel has a first toothing with a first outside diameter and an outer circumferential surface of the second gear wheel has a second toothing with a second outside diameter. The gear wheels intermesh via the toothings in order to convey a fluid. The gear wheels are arranged along an axial direction in the pressure chamber between the base plate and the cover element.

The pressure chamber is formed in the housing at least by two bores. The first gear wheel is arranged in a first bore with a first inside diameter. The second gear wheel is arranged in a second bore with a second inside diameter. A plurality of centering pins are provided for aligning the bores and the gear wheels with respect to one another, wherein all said centering pins are aligned with respect to one another exclusively via the cover element or via the base plate.

Aligned with respect to each other exclusively via the cover element or via the base plate means in particular that all the centering pins are first of all arranged and aligned with respect to one another in a single component of the pump assembly, i.e. either in the cover element or in the base plate, before the further assembly of the pump arrangement. This type of assembly is particularly also suitable on the fully fitted pump assembly.

Two intermeshing gear wheels are provided here as the conveying means. The circumferential surface of each gear wheel has a toothing, wherein the gear wheels are coupled to each other via the toothing. The gear wheels each have an axis of rotation, said axes of rotation being oriented in particular along an axial direction. The gear wheels can be arranged next to each other in a radial direction and overlapping in the axial direction with respect to each other, wherein the axes of rotation are arranged parallel to each other.

The housing is formed at least by one base plate and a cover element. These are arranged one behind the other along the axial direction, with the gear wheels being positioned in between. The base plate and the cover element surround the gear wheels on the outside in a radial direction and thus form the pressure chamber. The pressure chamber is connected to a fluid input and a fluid output, and therefore a fluid can be conveyed via the fluid input and the pressure chamber to the fluid output.

A component of the pump assembly which determines, sets or fixes the arrangement and positioning of other components of the pump assembly with respect to one another via an outer circumferential surface (i.e. the position thereof in space, in particular in a radial direction transversely with respect to the axes of rotation of the gear wheels) can be referred to as a centering pin. A centering pin can be a separate component. A centering pin can be formed integrally (on one side) with one of the components of the pump assembly. A centering pin can have an elongate and optionally substantially cylindrical shape. A centering pin can be connected in a force-fitting, integrally bonded or form-fitting manner to one or more of the following components: the base plate, the intermediate element and the cover element.

In particular, the first gear wheel and the second gear wheel are each designed as a ring gear, wherein the first gear wheel is arranged on a first bearing bushing and the second gear wheel is arranged on a second bearing bushing. The first bearing bushing and the second bearing bushing can each be mounted only either in the base plate or the cover element. The first bearing bushing and the second bearing bushing can each form a centering pin.

In particular, the bearing bushings are designed as what are referred to as plain bearings or friction bearings. In the plain bearing/friction bearing, the two parts moving relative to each other (here the gear wheel and the bearing bushing, or the bearing bushing and the housing, i.e. the base plate and the cover element) are in direct contact. They slide on each other counter to the resistance caused by sliding friction. This can be kept low by selection of a low-friction material pairing, by lubrication or by production of a lubricating film (full lubrication) which separates the two contact surfaces from each other. However, rolling bearings can also be provided, wherein a rolling bearing is then arranged between the bearing bushing and the gear wheel.

In particular, the fluid conveyed by the pump serves as a lubricating means for the mounting. Special fluid guides can be provided here in the base plate and/or the cover element, through which some of the fluid conveyed by the pump is conducted to the bearing point.

Each gear wheel can be mounted in the housing (i.e. either in the base plate or in the cover element) only on one side of the gear wheel via the bearing bushing. The bearing bushing provided for the mounting of each gear wheel extends from the gear wheel only to the base plate or to the cover element. The bearing bushing is therefore mounted or fastened in the housing only on one side of the gear wheel, i.e. has only one bearing point. Forces acting in the radial direction are thus transmitted from the gear wheel to the bearing bushing (via the bearing point between the gear wheel and the bearing bushing) and from the bearing bushing via the bearing point present only on one side of the gear wheel (between the bearing bushing and the housing) to the housing.

In particular, the two bearing bushings (first bearing bushing and second bearing bushing) are mounted or fastened only in the base plate or only in the cover element. In particular, the two bearing bushings extend from the respective gear wheel in the direction of the same part of the housing, i.e. also in the same axial direction.

This arrangement is particularly advantageous because it is thus necessary for a corresponding toleration of the position to be undertaken only on one of the parts of the housing, i.e. on the base plate or on the cover element.

At least one of the bearing bushings (particularly preferably the two bearing bushings) is preferably connected to the base plate or to the cover element via a press fit. A press fit means here that, before the bearing bushing and housing are joined, an outside diameter of the bearing bushing is larger than an inside diameter of the receiving bore (in the housing) for the bearing bushing.

At least one of the bearing bushings (particularly preferably the two bearing bushings) is preferably connected in an integrally bonded manner to and formed integrally with the base plate or the cover element (for example is embodied as a single-part or multi-part green compact and then jointly sintered).

All connections in which the connection partners are held together by atomic or molecular forces are mentioned as integrally bonded connections. They are simultaneously non-releasable connections which can be separated only by destruction of the connecting means.

In particular, it is proposed that a plain bearing is provided between the bearing bushing and the gear wheel designed as a ring gear. In particular, the bearing bushing is therefore arranged fixedly in the housing (i.e. in the base plate or in the cover element), and therefore a bending loading of the bearing bushing can be reduced or a defined transmission of force from the bearing bushing to the housing can take place via the bearing point between the bearing bushing and the housing. Furthermore, a precise alignment of the two gear wheels with respect to each other is thus possible since the two bearing bushings are arranged together in the same component of the housing.

In particular, an intermediate element is arranged along the axial direction between the base plate and the cover element, wherein the intermediate element has the bores and surrounds the gear wheels on the outside in a radial direction and, together with the base plate and the cover element, forms the pressure chamber. The intermediate element is in particular a disk element which has tolerances in respect of a width of the gear wheels and therefore defines a length of the pressure chamber along the axial direction.

In particular, at least the base plate and the cover element (optionally in addition to the intermediate element) are aligned with respect to each other and interconnected via connecting elements, wherein each connecting element forms a centering pin. In particular, at least one of the connecting elements extends along the axial direction through the intermediate element and connects the base plate and the cover element.

In particular, the first gear wheel is arranged on a first bearing bushing and the second gear wheel is arranged on a second bearing bushing, wherein the first bearing bushing and the second bearing bushing are each mounted only in the base plate or the cover element. At least the base plate and the cover element are aligned with respect to each other and interconnected via connecting elements. The connecting elements and the bearing bushings are connected to the cover element and/or to the base plate via a press fit and/or an integrally bonded connection.

The connecting elements and the bearing bushings are preferably connected to the cover element and/or to the base plate via a press fit and/or an integrally bonded connection. The connecting elements and the bearing bushings thus form centering pins which, via their outer circumferential surfaces, determine the positioning of the other components. The bearing bushings determine the positions of the gear wheels in the radial direction. The connecting elements determine the positions of the bores in the radial direction.

By means of the arrangement of all of the centering pins (for example connecting elements and bearing bushings) in a single component of the pump arrangement, namely in the base plate or in the cover element, the gear wheels can be aligned very precisely in relation to the bores, and therefore the pump can achieve a high degree of efficiency. As a result of this configuration, only very short tolerance chains are produced, and therefore a high degree of accuracy in the alignment of the gear wheels and bores with respect to one another can be achieved.

In particular, at least one of the gear wheels is drivable as a driving gear wheel via a drive shaft, wherein the drive shaft is (directly) connectable to the driving gear wheel via an opening in the cover element.

It is possible to drive each of the gear wheels via a respective drive shaft.

In particular, the drive shaft is not used to transmit any force acting in the radial direction from the gear wheels to the housing via the drive shaft. In particular, the drive shaft therefore merely transmits a driving torque, which acts in the circumferential direction, to the driving gear wheel.

According to a preferred embodiment, at least the base plate and the cover element are at least partially designed as sintered parts.

At least the bearing bushings are preferably (completely) designed as sintered parts.

Particularly preferably, at least one of the following components, in particular a plurality of or all of the components of the following group, is or are designed as a sintered part: the base plate, the cover element, the intermediate element, the bearing bushings, the gear wheels and the connecting elements.

A sintered part is a component (green compact) pressed from a pulverulent material which has subsequently been subjected to a sintering process. In particular, at least one, preferably all of: the base plate, the cover element, the intermediate element, the bearing bushings, the gear wheels and the connecting elements, are produced from a metallic powder by pressing and sintering. In particular, bearing bushings and that component of the housing which accommodates the bearing bushings are produced as separate green compacts (preferably from different materials), are joined together as green compacts (preferably with a press fit being formed) and are then jointly sintered (with an integrally bonded connection being formed).

Furthermore, a method for producing a pump assembly, in particular the pump assembly described here is proposed, wherein the pump assembly has at least one housing with at least one base plate and a cover element and also two gear wheels as conveying means. An outer circumferential surface of the first gear wheel has a first toothing with a first outside diameter and an outer circumferential surface of the second gear wheel has a second toothing with a second outside diameter. The gear wheels are each designed as ring gears. The method comprises at least the following steps:

a) providing the base plate, the cover element, the first gear wheel and the second gear wheel (optionally additionally an intermediate plate); wherein a plurality of centering pins are provided only in either the base plate or the cover element for aligning the gear wheels with respect to a pressure chamber provided in the housing. A first bearing bushing for receiving the first gear wheel, a second bearing bushing for receiving the second gear wheel, and at least two connecting elements are provided as the centering pins.
b) arranging the first gear wheel on the first bearing bushing, and arranging the second gear wheel on the second bearing bushing, such that the gear wheels intermesh via the toothings in order to convey a fluid;
c) connecting the base plate and the cover element to form a housing, with the pressure chamber being formed, by the connecting elements, wherein the gear wheels are arranged along an axial direction between the base plate and the cover element in bores of the housing.

The bearing bushings and/or the connecting elements are preferably connected to the base plate or to the cover element via a press fit or in an integrally bonded manner. In particular, the bearing bushings and the base plate are already connected (or formed together, i.e. integrally) before the sintering.

The explanations regarding the pump assembly apply in the same manner to the method, and vice versa.

It should be noted, by way of precaution, that the numerals ("first", "second", . . . ) used here serve primarily (only) to distinguish between multiple objects or variables of the same type, that is to say they do not necessarily predetermine, in particular, any dependency and/or sequence of these objects or variables in relation to one another. Should a dependency and/or sequence be necessary, this is explicitly specified here or it will be obvious to a person skilled in the art as he/she studies the configuration specifically described.

BRIEF DESCRIPTION OF THE FIGURES

The invention and the technical environment will be explained in more detail below with reference to the figures. It should be pointed out that the invention is not intended to be restricted by the exemplary embodiments shown. In particular, unless specifically presented otherwise, it is also possible for certain aspects of the subject matter explained in the figures to be extracted and combined with other constituent parts and findings from the present description and/or figures. It should be pointed out in particular that the figures and in particular the ratios of variables illustrated are merely schematic. The same reference signs denote the same objects, and this makes it possible for explanations from other figures to be used in supplementary fashion where appropriate. In the figures.

DETAILED DESCRIPTION

Figure 1:
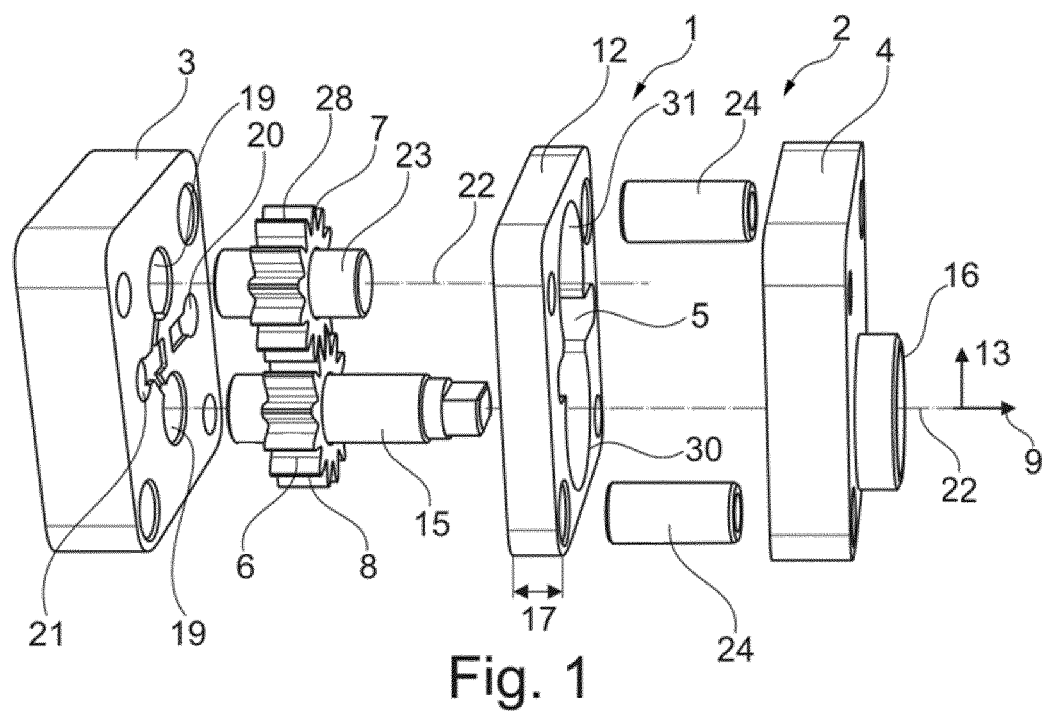
FIG. 1: shows a first pump assembly in a perspective view and in an exploded illustration.
Figure 2:
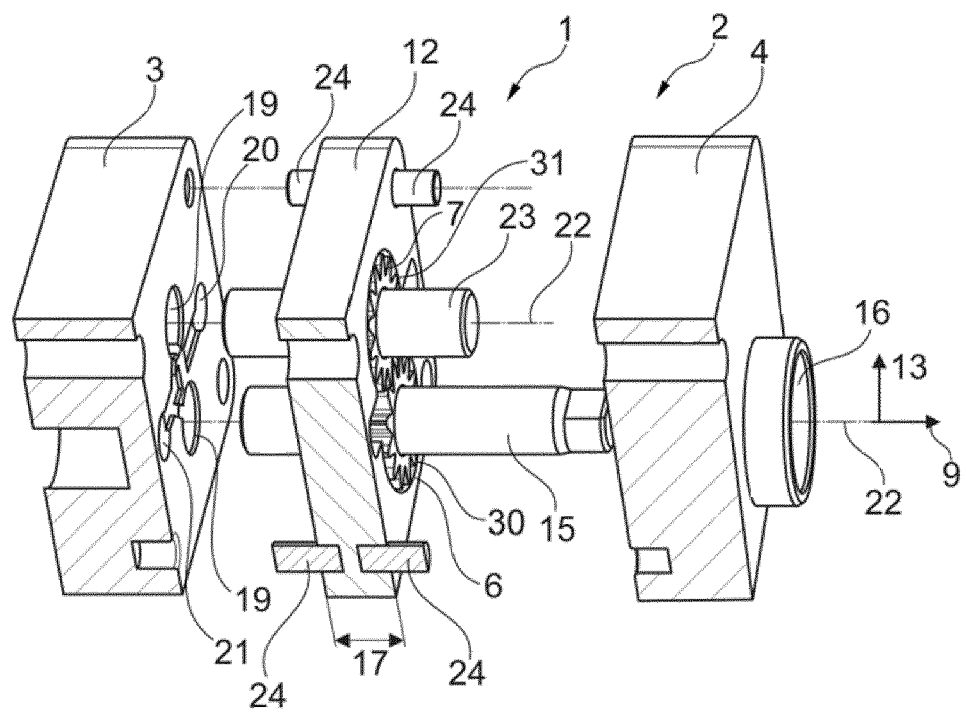
FIG. 2: shows a second pump assembly in a perspective view and in an exploded illustration.

FIG. 1 shows a first pump assembly (at least partially differing from the pump assembly newly proposed here) in a perspective view and in an exploded illustration. FIG. 2 shows a second pump assembly (at least partially differing from the pump arrangement newly proposed here) in a perspective view and in an exploded illustration. FIGS. 1 and 2 will be partially described together below.

The pump assembly 1 comprises a housing 2 and conveying means in the housing 2 for conveying a fluid from a fluid input 20 to a fluid output 21. The fluid input 20 and fluid output 21 are arranged on or in the housing 2. The housing 2 comprises a base plate 3 and a cover element 4 and also an intermediate element 12, which are interconnectable via connecting elements 24 in order to form a pressure chamber 5. The conveying means are arranged along an axial direction 9 in the pressure chamber 5 between the base plate 3 and the cover element 4. The intermediate element 12 surrounds the gear wheels 6, 7 on the outside in a radial direction. The intermediate element 12 is a disk element which has tolerances in respect of a width of the gear wheels 6, 7 and therefore defines a length 17 of the pressure chamber 5 along the axial direction 9. The intermediate element has a first bore 30 and a second bore 31. The first gear wheel 6 is arranged in the first bore 30 and the second gear wheel 7 is arranged in the second bore 31. One of the conveying means is driven via a drive shaft 15 which extends into the housing 2 from outside the housing 2 via an opening 16. Two intermeshing gear wheels 6, 7 are provided here as the conveying means. Each gear wheel 6, 7 has a toothing 8, 28 on the outer circumferential surface, wherein the gear wheels 6, 7 are coupled to each other via the toothings 8, 28 in order to convey a fluid.

The gear wheels 6, 7 have axes of rotation 22 which are oriented along an axial direction 9. The gear wheels 6, 7 are arranged next to each other in a radial direction 13 and overlapping in the axial direction 9, wherein the axes of rotation 22 are arranged parallel to each other.

The conveying means are arranged on shafts 15, 23 and the shafts 15, 23 are mounted on bearing points 19 in the housing 2 on both sides of the conveying means, i.e. here in the base plate 3 and in the cover element 4. Furthermore, a drive shaft 15 is connected directly to the conveying means and the conveying means is mounted on bearing points 19 via the drive shaft 15. Mounted means here that forces acting in a radial direction 13 (optionally additionally in an axial direction 9) are transmitted at least in a radial direction 13 (optionally also in the axial direction 9) via the conveying means to the shaft 15, 23 or to the bearing point 19 of the shaft 15, 23 in the housing 2. However, a mounting of the shaft 15, 23 on both sides of the conveying means requires a precise coordination of the positional tolerances of the bearing points 19 on the housing 2. In particular, however, nonuniform loadings of the bearing points 19 and bending loadings of the shafts 15, 23 may thus occur.

Connecting elements 24 which extend through the intermediate element 12 and are accommodated at their two ends in receiving bores in the base plate 3 and in the cover element 4 are provided in FIG. 1.

Connecting elements 24 which are each arranged on one side of the intermediate element 12, wherein in each case one connecting element 24 connects the intermediate element 12 and the base plate 3 and in each case another connecting element 24 connects the intermediate element 12 and the cover element 4, are provided in FIG. 2.

Figure 3:
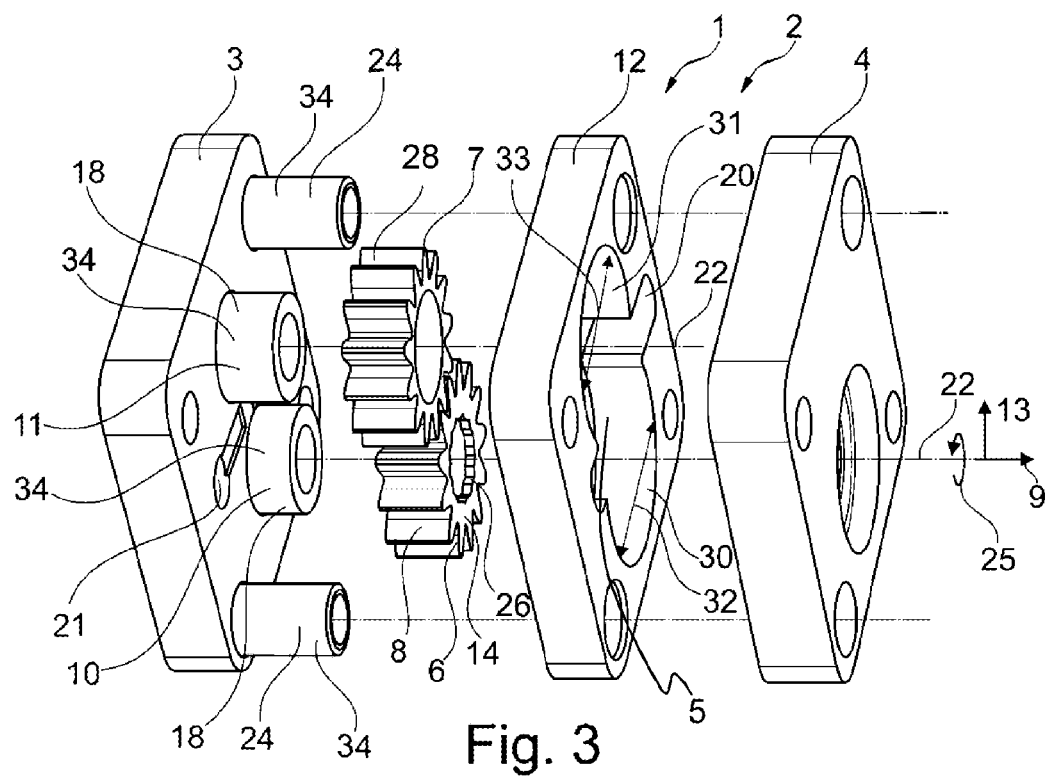
FIG. 3: shows a third pump assembly in a perspective view and in an exploded illustration.
Figure 4:
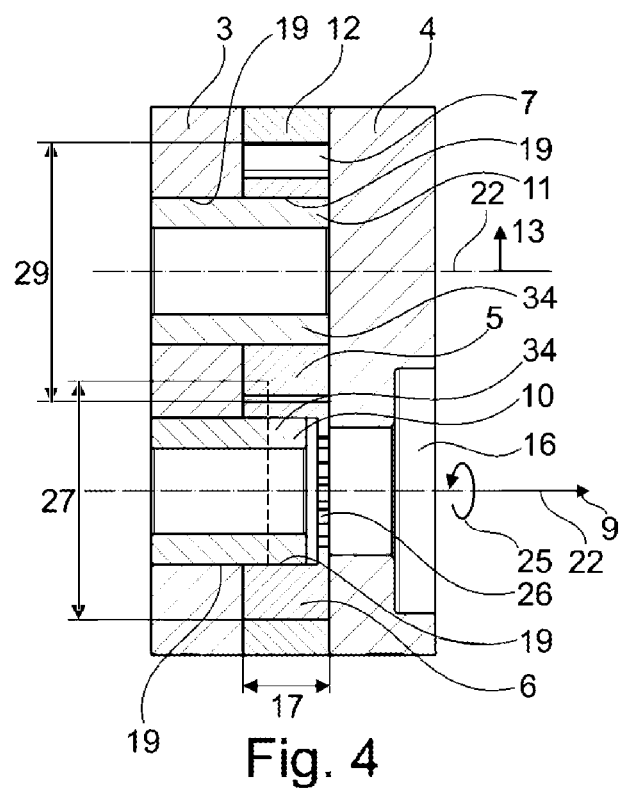
FIG. 4: shows the pump assembly according to FIG. 3 in section in a side view.

FIG. 3 shows a third pump assembly in a perspective view and in an exploded illustration. FIG. 4 shows the pump assembly 1 according to FIG. 3 in section in a side view. FIGS. 3 and 4 will be described together below.

The pump assembly 1 comprises a housing 2 and two gear wheels 6, 7 as conveying means. The housing 2 comprises a base plate 3, an intermediate element 12 and a cover element 4, which are interconnectable via connecting elements 24 in order to form a pressure chamber 5. An outer circumferential surface of each of the two gear wheels 6, 7 has a toothing 8, 28, and the gear wheels intermesh via the toothings 8, 28 in order to convey a fluid. The gear wheels 6, 7 are arranged along an axial direction 9 in the pressure chamber 5 between the base plate 3 and the cover element 4. The first gear wheel 6 and the second gear wheel 7 are each designed as a ring gear, wherein the first gear wheel 6 is arranged on a first bearing bushing 10 and the second gear wheel 7 is arranged on a second bearing bushing 11. The first bearing bushing 10 and the second bearing bushing 11 are each arranged only in the base plate 3. The gear wheels 6, 7 have axes of rotation 22 which are oriented along an axial direction 9. The gear wheels 6, 7 are arranged next to each other in a radial direction 13 and overlapping in the axial direction 9, wherein the axes of rotation 22 are arranged parallel to each other.

The base plate 3, the intermediate element 12 and the cover element 4 are arranged one behind another along the axial direction 9, wherein the gear wheels 6, 7 are positioned between them. The intermediate element 12 surrounds the gear wheels 6, 7 on the outside in a radial direction 13 and thus forms the pressure chamber 5 with the other parts of the housing 2. The intermediate element 12 is a disk element which has tolerances with respect to a width of the gear wheels 6, 7 and therefore defines a length 17 of the pressure chamber 5 along the axial direction 9. The pressure chamber 5 is connected to a fluid input 20 and a fluid output 21, and therefore a fluid can be conveyed via the fluid input 20 and the pressure chamber 5 to the fluid output 21.

The bearing bushings 10, 11 are designed as what are referred to as plain bearings 18. In the plain bearing 18, the two parts moving relative to each other (here the gear wheel 6, 7 and the bearing bushing 10, 11) are in direct contact. They slide on each other counter to the resistance caused by the sliding friction and form the bearing point 19 for the gear wheels 6, 7.

Each gear wheel 6, 7 is therefore mounted only on one side of the gear wheel 6, 7 in the housing 2, here in the base plate 3 via bearing points 19. The bearing bushing 10, 11 provided for the mounting of each gear wheel 6, 7 extends from the gear wheel 6, 7 only to the base plate 3. The bearing bushing 10, 11 is therefore mounted or fastened only on one side of the gear wheel 6, 7 in the housing 2, i.e. has only one bearing point 19.

A plain bearing 18 is provided between each bearing bushing 10, 11 and the gear wheel 6, 7 designed in each case as a ring gear. The bearing bushings 10, 11 are arranged fixedly in the housing 2 (i.e. in the base plate 3).

The base plate 3 and the cover element 4 and additionally the intermediate element 12 are aligned with respect to one another and interconnected via connecting elements 24. The connecting elements 24 extend along the axial direction 9 through the intermediate element 12 and connect the base plate 3 and the cover element 4.

One of the gear wheels 6, 7 is drivable as a driving gear wheel 14 via drive shaft 15 (see FIGS. 1 and 2), wherein the drive shaft 15 is connectable to the driving gear wheel 14 via an opening 16 in the cover element 4. As can be seen, an internal toothing 26 which is provided together with the drive shaft 15 for driving the driving gear wheel 14 is arranged on the driving gear wheel 14.

The drive shaft 15 is thus not used to transmit any force acting in the radial direction 13 from the gear wheels 6, 7 via the drive shaft 15 to the housing 2. The drive shaft 15 merely transmits a driving torque, which acts in the circumferential direction 25, to the driving gear wheel 14.

The pressure chamber 5 is formed at least by two bores 30, 31 in the housing 2, here in the intermediate element 12. The first gear wheel 6 with the first outside diameter 27 is arranged in the first bore 30 with a first inside diameter 32, and the second gear wheel 7 with the second outside diameter 29 is arranged in the second bore 31 with a second inside diameter 33. A plurality of centering pins 34 are provided for aligning the bores 30, 31 and the gear wheels 6, 7 with respect to one another, wherein all said centering pins 34 are aligned with respect to one another here exclusively via the base plate 3. The two connecting elements 24 and the first bearing bushing 10 and the second bearing bushing 11 each form a centering pin 34 here.

Aligned with respect to one another exclusively via the base plate 3 here that, for example, all of the centering pins 34 are first of all arranged in the base plate 3 and aligned with respect to one another before the further assembly of the pump assembly 1. This type of assembly is particularly also suitable on the completely mounted pump assembly 1.

Each component of the pump assembly 1 which determines the arrangement and positioning of other components of the pump assembly 1 via an outer circumferential surface (i.e. the position thereof in space, in particular in a radial direction 13 transversely with respect to the axes of rotation 22 of the gear wheels 6, 7) is referred to as a centering pin 34.

FIG. 3 also illustrates the method for producing a pump assembly 1. In step a) of the method, the base plate 3, the cover element 4, the intermediate element 12, the connecting elements 24, the first gear wheel 6 and the second gear wheel 7 are provided. An outer circumferential surface of the first gear wheel 6 has a first toothing 8 with a first outside diameter 27 and an outer circumferential surface of the second gear wheel 7 has a second toothing 28 with a second outside diameter 29. The gear wheels 6, 7 are each designed as ring gears. A plurality of centering pins 34 are provided only in the base plate 3, for aligning the gear wheels 6, 7 with respect to a pressure chamber 5 provided in the housing 2 or with respect to the bores 30, 31. The first bearing bushing 10 for receiving the first gear wheel 6, the second bearing bushing 11 for receiving the second gear wheel 7, and two connecting elements 24 are provided as the centering pins 34.

In step b), the first gear wheel 6 is arranged on a first bearing bushing 10, which is connected only to the base plate 3 and is mounted therein, and the second gear wheel 7 is arranged on a second bearing bushing 11, which is likewise connected only to the base plate 3 and is mounted therein, and therefore the gear wheels 6, 7 intermesh via the toothings 8, 28 in order to convey a fluid.

In step c), the base plate 3, the intermediate element 12 and the cover element 4 are aligned with respect to one another and interconnected by the connecting elements 24 to form a housing 2, with a pressure chamber 5 being formed, wherein the gear wheels 6, 7 are arranged along an axial direction 9 in the pressure chamber 5 between the base plate 3 and the cover element 4 or in the bores 30, 31 of the housing 2.

LIST OF REFERENCE SIGNS

1 Pump assembly
2 Housing
3 Base plate
4 Cover element
5 Pressure chamber
6 First gear wheel
7 Second gear wheel
8 First toothing
9 Axial direction
10 First bearing bushing
11 Second bearing bushing
12 Intermediate element
13 Radial direction
14 Driving gear wheel
15 Drive shaft
16 Opening
17 Length
18 Plain bearing
19 Bearing point
20 Fluid input
21 Fluid output
22 Axis of rotation
23 Shaft
24 Connecting element
25 Circumferential direction
26 Internal toothing
27 First outside diameter
28 Second toothing
29 Second outside diameter
30 First bore
31 Second bore
32 First inside diameter
33 Second inside diameter
34 Centering pin

The invention claimed is:

1. A pump assembly comprising
a housing with at least one base plate and a cover element, which are interconnectable in order to form a pressure chamber; and
a first gear wheel and a second gear wheel, wherein an outer circumferential surface of the first gear wheel has a first toothing with a first outside diameter and an outer circumferential surface of the second gear wheel has a second toothing with a second outside diameter, wherein the first gear wheel and the second gear wheel intermesh via the first toothing and the second toothing in order to convey a fluid; wherein the first gear wheel and the second gear wheel are arranged along an axial direction in the pressure chamber between the base plate and the cover element;
a plurality of centering pins including a plurality of connecting elements, all said centering pins and all said connecting elements are aligned with respect to one another by being exclusively positioned on one of the cover element or the base plate during initial assembly of the pump assembly to form a single component before structural connection of the other one of the cover element and the base plate with the single component to form the pump assembly during further assembly of the pump assembly,
wherein the pressure chamber is formed in the housing by at least two bores, wherein the first gear wheel is arranged in a first bore with a first inside diameter and the second gear wheel is arranged in a second bore with a second inside diameter,
wherein the plurality of centering pins of the single component align the first bore and the second bore and the first gear wheel and the second gear wheel with respect to one another at the initial assembly,
wherein at least the base plate and the cover element are aligned with respect to each other and interconnected via the connecting elements of the single component,
wherein the connecting elements are connected to the cover element or to the base plate via a press fit and/or an integrally bonded connection.

2. The pump assembly as claimed in claim 1, wherein the first gear wheel and the second gear wheel are each a ring gear, wherein the first gear wheel is arranged on a first bearing bushing and the second gear wheel is arranged on a second bearing bushing, wherein the first bearing bushing and the second bearing bushing each form a centering pin associated with the plurality of centering pins.

3. The pump assembly as claimed in claim 2, wherein at least one of the first bearing bushing and the second bearing bushing is connected to the base plate or to the cover element via a press fit.

4. The pump assembly as claimed in claim 2, wherein at least one of the first bearing bushing and the second bearing bushing is connected in an integrally bonded manner to and formed integrally with the base plate or the cover element.

5. The pump assembly as claimed in claim 1, wherein an intermediate element is arranged along the axial direction between the base plate and the cover element, wherein the intermediate element has the first bore and the second bore and surrounds the first gear wheel and the second gear wheel on the outside in a radial direction and, together with the base plate and the cover element, forms the pressure chamber, and the connecting elements of the single component pass through holes formed in the intermediate element.

6. The pump assembly as claimed in claim 1, wherein each connecting element of the single component forms a centering pin associated with the plurality of centering pins.

7. The pump assembly as claimed in claim 1, wherein the first gear wheel is arranged on a first bearing bushing and the second gear wheel is arranged on a second bearing bushing, wherein the first bearing bushing and the second bearing bushing are centering pins of the single component; the first bearing bushing and the second bearing bushing are connected to the cover element or to the base plate via a press fit and/or an integrally bonded connection.

8. The pump assembly as claimed in claim 1, wherein at least one of the first gear wheel and the second gear wheel is drivable as a driving gear wheel via a drive shaft, wherein the drive shaft is connectable to the driving gear wheel via an opening in the cover element.

9. The pump assembly as claimed in claim 1, wherein at least the base plate and the cover element are at least partially sintered parts.

10. The pump assembly as claimed in claim 1, wherein at least the first bearing bushing and the second bearing bushing are sintered parts.

11. A method for producing a pump assembly, wherein the pump assembly has at least one housing with at least one base plate and a cover element and also a first gear wheel and a second gear wheel as a conveying mechanism, wherein an outer circumferential surface of the first gear wheel has a first toothing with a first outside diameter and an outer circumferential surface of the second gear wheel has a second toothing with a second outside diameter, wherein the first gear wheel and the second gear wheel are each ring gears; wherein the method comprises the following steps:
a) providing the base plate, the cover element, the first gear wheel and also the second gear wheel, and a plurality of centering pins;
b) forming a single component of the pump assembly that contains all of the plurality of centering pins at initial assembly of the pump assembly, the centering pins of the single component configured for aligning the first gear wheel and the second gear wheel with respect to a pressure chamber provided in the housing during the initial assembly, wherein the centering pins of the single component include a first bearing bushing for receiving the first gear wheel, a second bearing bushing for receiving the second gear wheel, and at least two connecting elements configured to align and interconnect the base plate to the cover element during the initial assembly;
c) arranging the first gear wheel on the first bearing bushing of the single component during the initial assembly and arranging the second gear wheel on the second bearing bushing of the single component during the initial assembly such that the first gear wheel and the second gear wheel intermesh via the first toothing and the second toothing in order to convey a fluid during operation of the pump assembly;
d) connecting the base plate and the cover element together via the connecting elements of the single component to form the housing with the pressure chamber being formed therein during the initial assembly, wherein the first gear wheel and the second gear wheel are arranged along an axial direction of the pump assembly between the connected base plate and the cover element in bores of the housing.

12. The pump assembly as claimed in claim 1, wherein each of the first gear wheel and the second gear wheel is mounted to the first bearing bushing and the second bearing bushing of the single component at the initial assembly on only one side of the first gear wheel and on only one side of the second gear wheel.

* * * * *